UNITED STATES PATENT OFFICE.

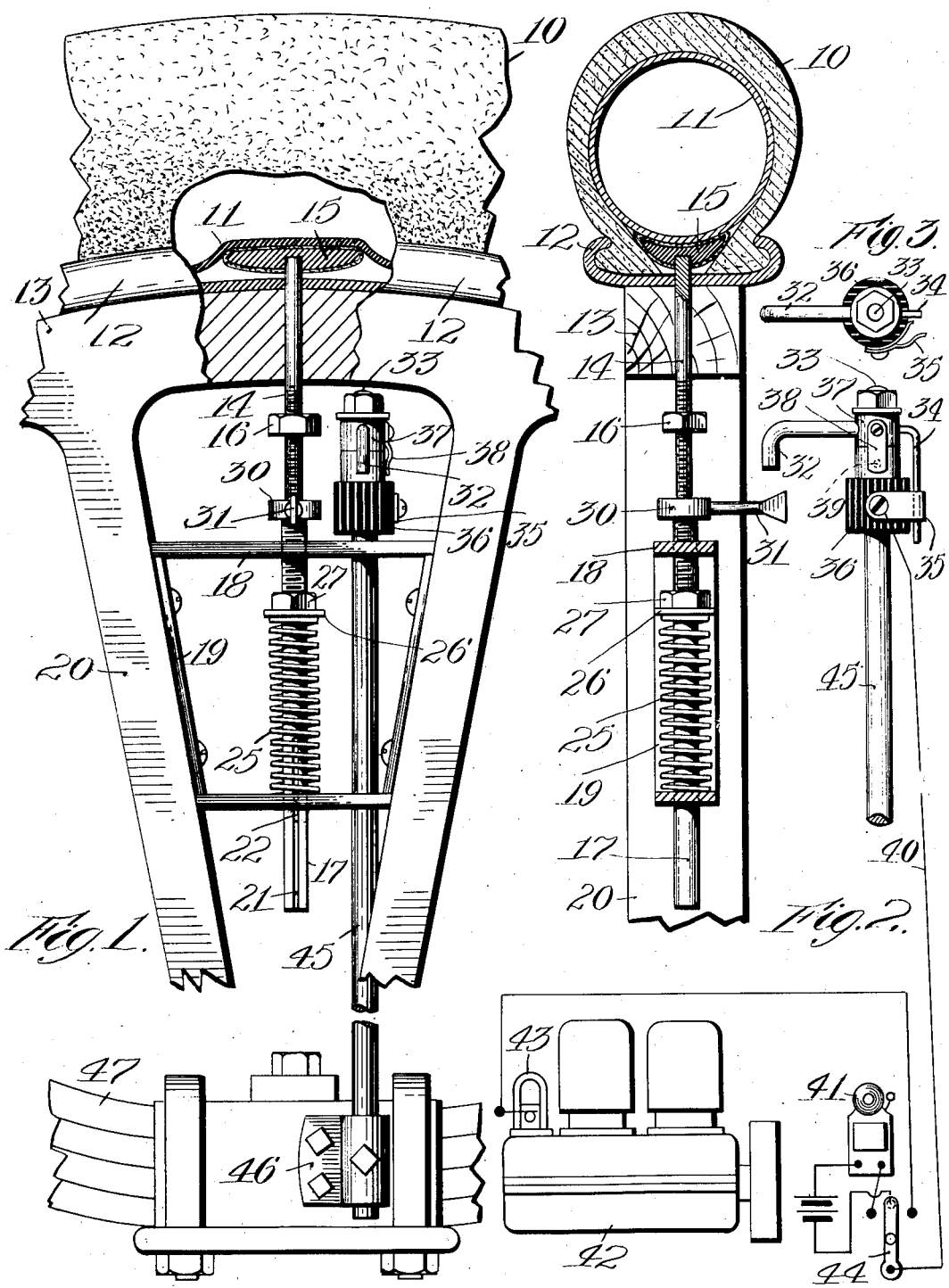

JAMES L. MARMAUD, OF WORCESTER, MASSACHUSETTS.

PUNCTURE-INDICATING DEVICE FOR TIRES.

No. 926,757.   Specification of Letters Patent.   Patented July 6, 1909.

Application filed September 14, 1908. Serial No. 452,828.

*To all whom it may concern:*

Be it known that I, JAMES L. MARMAUD, a citizen of the United States, residing at Worcester, in the county of Worcester and State of Massachusetts, have invented a new and useful Puncture-Indicating Device for Tires, of which the following is a specification.

This invention relates to a device for indicating when a pneumatic tire is punctured.

The principal objects of the invention are to provide means controlled by the pressure within the tire whereby the puncturing of a tire will be immediately and automatically indicated in an unmistakable way either by giving a signal or stopping the motor or engine; also to provide means whereby the same may be adjusted so as to permit the pressure in the tire to vary within certain limits.

Further objects and advantages of the invention will appear hereinafter.

Reference is to be had to the accompanying drawings, in which—

Figure 1 is a side elevation of a portion of a wheel partly in section showing one embodiment of this invention applied thereto; Fig. 2 is a transverse sectional view of the same showing certain electrical connections diagrammatically; and Fig. 3 is a plan of an electric contact forming a part of the system.

It has been found in practice that the most experienced operators of automobiles are at times unable to tell when a tire has been punctured. This results in many accidents and much delay. This invention is designed to immediately show the fact that a tire has been punctured, and if desired, to stop the engine or motor automatically as soon as any tire receives a puncture.

The invention is shown as applied to a well-known type of tire consisting of an outer tube 10 and an inner tube 11. These are mounted on a metal rim 12 secured to the rim 13 of the wheel. The rim 12 is provided with a perforation through which projects a plunger 14 having a plate 15 thereon, preferably of metal, and covered with canvas or other soft material. This plate partakes of the shape of the inner tube when inflated, and engages the same. Ordinarily while the inner tube is inflated it pushes the plate 15, and consequently the plunger, inwardly toward the center of the wheel to the limit to which they will go. The plunger is provided with a screw-thread on which is mounted a nut 16, and at its end it engages a movable rod 17 which is mounted to slide in a frame 18 having side pieces 19 by which it is secured to the spokes 20 of the wheel. This rod is provided with a groove 21 into which projects a tongue 22 from the frame to prevent the rod from turning. The wall of the frame presses a spring 25 which engages a washer 26 at the other end adjustably held in position by a nut 27 threaded on the rod. The purpose of the parts so far described is to provide an adjustable pressure on the plunger to tend to force it outwardly toward the tire.

In setting up the parts, the nut 16 is screwed up so as to bring the plate 15 to its seat so as to avoid pinching the inner tube, and the nut 27 is adjusted to the proper tension, and thus set for any desired number of pounds pressure. Then the tire is inflated and the nut 16 screwed down. Then whenever the pressure within the tire is reduced below the amount for which the spring is set, the plunger will move outwardly under the influence of the spring until the end of the nut 16 engages the inner surface of the wheel rim. The effect of this is to move a head 30 on the rod outwardly and carry with it an arm 31 which is carried thereby. On the next rotation of the wheel this arm will engage an arm 32 which is mounted to swing on a rod 33 as an axis and thus move a contact member 34 into engagement with its complementary member 35 which is mounted on an insulating cylinder 36. The arm 32 and contact member 34 turn with a drum 37 which is yieldingly held in position by a spring 38 having a projection engaging in a socket 39 in a fixed part of the device. When the members 34 and 35 are moved into contact as above described, they complete an electric circuit 40. This circuit is designed to give a signal through a bell 41, lamp, or other signal device, and also to connect with a motor or engine 42 and stop the same if desired, as by operating the magneto 43. A switch 44 is shown for controlling this. It will be undertood, of course, that a gas engine or electric motor may easily be stopped in this way, thus constituting a signal, but in case the device is applied to a car having a steam engine the light or bell alone will ordinarily be sufficient. The contact members 36, etc., are mounted to move along horizontally as the wheel travels, but not to turn therewith. For this purpose they are shown in the present instance as being carried by a rod 45 fixed on a bracket 46 secured to the springs 47 of the vehicle. This is for the rear axle, but it will be understood that on the front axle, these, or corresponding parts will be fixed to the stub axles in an obvious manner.

While I have illustrated and described one type of wheel and tire it will be understood that the invention is applicable to all kinds of pneumatic tires and the wheels to which they are applied, and to all types of automobiles and the like.

It will also be understood that the invention can be carried out in many other ways than that illustrated and described, without departing from the scope of the invention as expressed in the claims. Therefore I do not wish to be limited to the details shown and described, but What I do claim is:—

1. The combination with a wheel having a felly, and a pneumatic tire thereon, of a plunger mounted to reciprocate in said felly and having a plate thereon on the outer side of the felly for engaging the inner tube, means adjustable along said plunger to limit the motion of the plunger toward the tire, a reciprocable rod supported by the wheel in alinement with said plunger and adapted to engage the end thereof, means for yieldingly forcing the rod toward the plunger so as to hold said plate yieldingly against the tire, a signal device, and means on the rod for operating the signal device.

2. The combination with a wheel, and a tire thereon, of a trapezoidal frame mounted between two spokes of said wheel, said frame having two perforations therethrough in alinement, a rod mounted in said perforations and guided thereby, means on said frame for preventing the rod from turning, a spring for normally forcing said rod outwardly, a head on said rod having a projection, a signal device adapted to be controlled by said projection, and a plunger separate from the rod and engaging said head, said plunger extending through the rim or felly of the wheel and having means for bearing on the tire.

3. The combination with a tire having an inner tube, a rim having a perforation therein, a rod projecting through said perforation into the outer tube, a plate on the rod adapted to be pressed outwardly by the inner tube when inflated, and means controlled by said rod for giving a signal when part of the air is let out of the inner tube, said means comprising a rod engaging the end of said plunger and separate therefrom, a spring for normally forcing said rod and plunger toward the inner tube, and means connected with said rod for closing the electric circuit.

4. The combination with a tire having an inner tube, a rim having a perforation therein, a rod projecting through said perforation into the outer tube, a plate on the rod adapted to be pressed outwardly by the inner tube when inflated, means controlled by said rod for giving a signal when part of the air is let out of the inner tube, an adjustable stop on said rod to limit the distance which it will move toward the inner tube, and a spring-pressed rod separate from the plunger for forcing the plunger toward the inner tube.

5. The combination with a pneumatic tire, of a plunger normally held out by the pressure therein, an independent rod engaging the end of said plunger and in line therewith, means for preventing said rod from turning, a spring adjustably connected with said rod for forcing the rod and plunger inwardly, an arm connected with the rod, and an electric circuit having a contact adapted to be closed by said arm.

6. The combination with a wheel, of a pneumatic tire thereon, a plunger extending into said tire, a frame secured to the spokes of the wheel, a rod movably mounted in said frame and guided thereby to engage the end of the plunger, a spring for forcing said rod outwardly, an arm projecting from said rod, and an electric contact in position to be engaged and closed by said arm when the plunger moves toward the tire.

7. The combination with a wheel, a pneumatic tire thereon, a plunger extending through the felly of the wheel to engage the tire, a reciprocable rod carried by the wheel and engaging the plunger, and a projection on the rod, of an electric circuit, a rod having a projecting arm thereon in position to be engaged by said projection when the plunger moves around to a position parallel with said rod, said arm being pivoted on said rod as an axis, a cylinder of insulating material on the rod, a conductor on the arm adapted to swing therewith, a conductor on said cylinder adapted to be engaged by the first named conductor when the arm swings, said conductors constituting the terminals of said circuit, and means for normally holding said conductors out of contact.

In testimony whereof I have hereunto set my hand, in the presence of two subscribing witnesses.

JAMES L. MARMAUD.

Witnesses:
A. E. FAY,
C. FORREST WESSON.